Patented Dec. 10, 1929

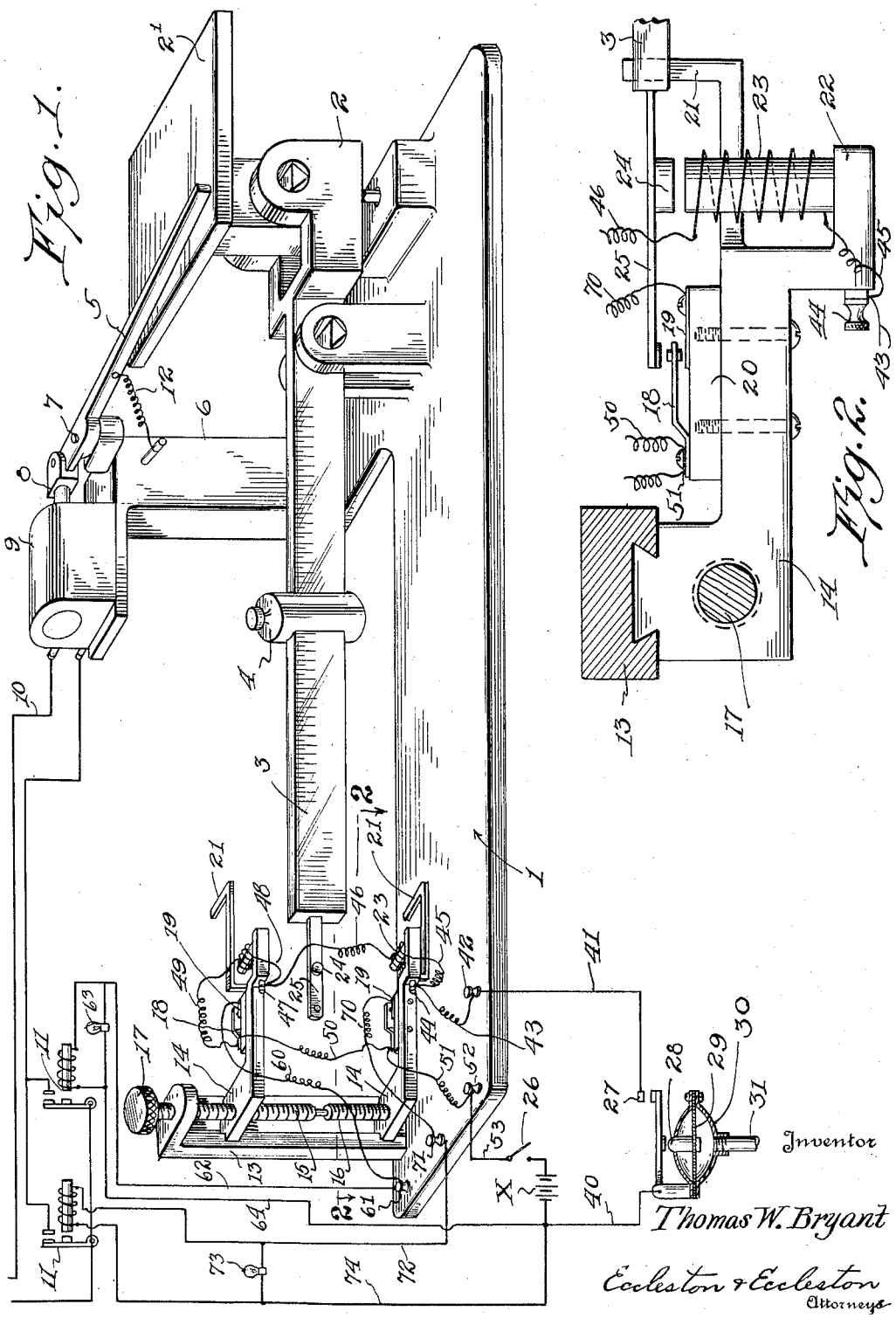

1,738,634

UNITED STATES PATENT OFFICE

THOMAS W. BRYANT, OF ZANESVILLE, OHIO, ASSIGNOR TO HAZEL-ATLAS GLASS CO., OF WHEELING, WEST VIRGINIA, A CORPORATION OF WEST VIRGINIA

AUTOMATIC ACCEPTING AND REJECTING MACHINE

Application filed August 17, 1925. Serial No. 50,820.

This invention relates to an automatic mechanism for testing the weight of bottles and other glassware formed on a bottle-making machine, and for rejecting those pieces of ware which do not conform to a predetermined standard of weight, and has special reference to mechanisms such as disclosed in my copending application Ser. No. 48,153, filed August 4, 1925.

As stated in the specification accompanying the application just referred to the bottle making art has very stringent requirements as to the weight of the articles fabricated, making it necessary heretofore to employ a number of selectors to eliminate before packing such articles as might be above or below the standard required. The subject matter of the copending application as well as the present application comprises weighing scales so connected with the bottle-making machine as to test each piece of ware manufactured and to automatically accept or reject the same, depending on whether the article conforms to the requirements as to weight or is above or below such requirements. The present invention however, overcomes what might be considered an objection in the earlier disclosure in that the permanent magnet is eliminated from the scale beam thereby facilitating the return of the beam to normal position after a bottle of overweight is ejected from the machine.

A further object of the invention and one closely related to that just mentioned is the provision of electric circuits which are immediately opened after being closed, thus at once freeing the beam of the scales from all magnetic influences or forces and rendering the mechanism more sensitive to the weights of the articles being tested.

Another object of the invention resides in the provision of electric circuits to give one signal when a bottle of overweight is being tested and another signal when a bottle of under-weight is being tested.

Other objects and advantages of the invention will be apparent from the following description when taken in connection with the accompanying drawings, in which:

Figure 1 is a perspective view of the apparatus.

Figure 2 is a section taken on line 2—2 of Figure 1.

Referring to the drawings more in detail, the numeral 1 designates a base plate on which the operating parts of the bottle-testing machine are mounted. In the present embodiment of the invention the scales which form an essential part of the structure are indicated generally by the numeral 2, and it will be understood that the conventional type of scales shown is to be considered merely as illustrative and that any other well-known type of scales may be readily substituted. As shown the scales comprise the platform 2' operatively mounted on the beam 3, and the usual counterbalance 4.

The immediate means for removing a defective bottle from the scales so as to prevent its passage to the annealing ovens and to the shipping department, comprises a kicker member 5 which is pivoted to the upper end of the standard 6 as indicated by the numeral 7. This member is mounted for oscillation across the platform 3 of the scales and to impart such movement thereto the rear end of the arm is pivotally connected to the plunger 8 of the solenoid 9 which is electrically connected in the circuit 10. This circuit is controlled by either of the two relay switches 11 which will be referred to in greater detail hereinafter. For the present it will suffice to say that when either of the switches 11 is closed the plunger 8 will be retracted so as to swing the kicker member 5 across the platform 3. Retraction of the kicker member is accomplished by coil spring 12 which has its respective ends attached to the kicker member and to the standard 6.

I will now describe the mechanism for controlling the opening and closing of the circuit 10 and which thus determines whether the particular bottle on the scales at the time will be accepted or ejected.

Mounted on the base plate 1 adjacent the free end of beam 3 is a vertically extending bracket 13 in which is slidably mounted the horizontally disposed plates 14. One of these plates is provided with a right hand threaded aperture and the other with a left hand threaded aperture which receive the right and left hand screws 15 and 16 formed on the bolt 17. Obviously, by this construction the plates 14 may be simultaneously moved farther apart or closer together as desired.

As more clearly disclosed in Figure 2 of the drawing, each plate 14 carries a switch comprising the spring contact 18 and the contact plate 19 mounted on a block of insulation 20. Also forming a part of each plate 14 are the extensions 21 and 22, the former of which acts as a stop to limit the extent of oscillation of the beam 3 and the latter of which forms a support for the electro-magnet 23; these magnets being suitably disposed for cooperation with a soft iron disc 24 carried by the spring arm 25 mounted on the free end of beam 3. The construction and arrangement of these parts is such that when the electro-magnets are energized and the disc 24 moved into alignment with either of them the arm 25 will be attracted and thus act as a switch-operating member for the switches 18—19.

The circuit including the switches 18—19 and electro-magnets 23, which controls the relay switches 11, will now be described.

This circuit which is energized by a battery X is provided with a hand switch 26 by which the apparatus may be thrown in or out of operation and with a switch 27 which is periodically operated by means of a plunger 28 mounted on diaphragm 29 enclosed in casing 30; a compressed air pipe 31 opening into the casing for imparting the necessary vibration to the diaphragm.

Starting from one side of the battery X the circuit leads through conductor 40 to switch 27, conductor 41, binding post 42, conductor 43, binding post 44, conductor 45, around the core of the lower electro-magnet 23, thence by conductor 46 to binding post 47, conductor 48 to the core of the upper electro-magnet 23, conductor 49 to upper spring contact 18, conductor 50 to lower spring contact 18, conductor 51 to binding post 52, and thence by conductor 53 to switch 26 and the opposite side of the battery. By thus tracing a portion of the battery circuit it will be observed that upon each vibration of the plunger 28 both electro-magnets 23 are energized and are prepared to attract the switch-operating member 25 in the event that its soft metal disc 24 is brought into alignment with either of them.

Let it be assumed that a bottle of greater weight than that for which the mechanism is adjusted is placed upon the weighing scales. The free end of beam 3 will be raised above the horizontal and disc 24 brought into alignment with the upper electro-magnet 23. The disc will be immediately attracted to the energized electro-magnet and will thus cause the arm 25 to engage the spring contact 18 thereby closing the upper switch 18—19. By closing this switch the electro-magnet 23 is obviously short-circuited, the current now passing through conductors 53, 51, 50 to spring contact 18, contact 19, conductor 60, binding post 61 conductor 62 to the signal or alarm 63, relay switch 11, and to the opposite side of the battery through conductor 64. This action will, of course, close relay switch 11 (at the right of Fig. 1) and operate kicker member 5 to reject the bottle.

Let it now be assumed that the bottle placed upon the weighing scales is of less weight than that for which the mechanism is adjusted. The lower switch 18—19 will of course be closed in the manner just described, and the current will flow through conductors 53, 51, lower spring contact 18, contact 19 conductor 70, to binding post 71, conductor 72 to the signal or alarm 73 and relay switch 11 (at the left of Fig. 1) and return to the opposite side of the battery through conductor 74. In this operation also the relay switch will be closed and the kicker member operated to reject the bottle on the platform.

It is believed to be unnecessary to describe in detail the operation of the device in association with the bottle forming machine and the conveyer, this feature of the invention having been fully set forth and claimed in my copending application above referred to. It may be well to state however, that the articles are mechanically lifted from the forming machine to the platform of the scales and if of proper weight are then mechanically transferred to the conveyer.

In the operation of the testing machine the switch 27 is periodically closed by air under pressure just after a bottle is placed upon the platform 2'. This causes the electro-magnet 23 to become energized directly after the beam 3 assumes its balanced position, and if the disc 24 is brought into alignment with either of the magnets the latter are immediately short-circuited thus releasing the switch operator 25 immediately after it has closed the switch 18—19 and sent an impulse through the signal and the relay switch 11 to operate the kicker member 5. By thus cutting out the electro-magnets it will be apparent that the beam 3 is released so as to return to inoperative position, thereby eliminating any tendency toward sluggishness in this element.

From the foregoing description taken in connection with the accompanying drawings it will be seen that I have devised an improved automatic accepting and rejecting machine which will operate either of two signals depending upon whether the bottle is above or below the prescribed limits of weight, thereby giving definite warning to the operator so that he may make the required adjustments in the forming apparatus; and that the machine is rendered extremely sensitive due to the fact that the scale beam is quickly released after each rejection of a bottle so that it may return to normal or inoperative position.

In compliance with the patent statutes I have described what I now believe to be the preferred embodiment of the invention, but it is to be understood that the specific construction shown is to be considered as illustrative merely, and that the invention is capable of various modifications all of which I intend to include within the scope of the appended claims.

What I claim as new and desire to secure by Letters Patent is:

1. In a bottle-testing machine, weighing scales, a kicker member, an electric circuit controlling the kicker member, a switch in said circuit, a switch-operating member, and an electro-magnet for controlling said switch-operating member.

2. In a bottle-testing machine, weighing scales, a kicker member, an electric circuit controlling the kicker member, a switch in said circuit, a switch-operating member connected with said scales, and an electro-magnet for controlling said switch-operating member.

3. In a bottle-testing machine, weighing scales including a platform and a beam, an electric circuit including a switch controlling a kicker member, a switch-operating member carried by said beam, and an electro-magnet for controlling said switch-operating member.

4. In a bottle-testing machine, weighing scales including a platform and a beam, an electric circuit including a pair of switches controlling a kicker member, a switch-operating member carried by said beam, and a pair of electro-magnets for controlling said switch-operating member.

5. In a bottle-testing machine, weighing scales including a platform and a beam, an electric circuit including a pair of vertically spaced switches controlling a kicker member, a switch-operating member carried by said beam, and a pair of electro-magnets for controlling said switch-operating member.

6. In a bottle-testing machine, weighing scales including a platform and a beam, an electric circuit including a pair of vertically spaced switches controlling a kicker member, a switch-operating member carried by said beam, a pair of electro-magnets for controlling said switch-operating member, and means for varying the space between said switches.

7. In a bottle-testing machine, weighing scales including a platform and a beam, an electric circuit including two switches controlling a kicker member, a switch-operating member carried by said beam, an electro-magnet adapted to cause the switch-operating member to close one of said switches, and means for periodically closing the other switch.

8. In a bottle-testing machine, weighing scales including a platform and a beam, an electric circuit including a plurality of switches controlling a kicker member, a switch-operating member carried by said beam, electro-magnets adapted to cause the switch-operating member to close either of two of said switches, and means for periodically operating another of said switches.

9. In a bottle-testing machine, weighing scales including a platform and a beam, an electric circuit including a plurality of switches, two of which are vertically spaced, controlling a kicker member, a switch-operating member carried by said beam, two vertically spaced electro-magnets adapted to control the operation of said switch-operating member, means for varying the space between said last-named switches, and means for periodically operating another of said switches.

10. In a bottle-testing machine, weighing scales including a platform, an electric circuit including a relay switch controlling a kicker member for cooperation with said platform, a second circuit for controlling said relay switch, a pair of vertically spaced switches in said second circuit, electro-magnets adjacent said switches, and a switch-operating member associated with said scales and adapted to be operated by said electro-magnets.

11. In a bottle-testing machine, weighing scales including a platform, an electric circuit including a relay switch controlling a kicker member for cooperation with said platform, a second circuit for controlling said relay switch, a pair of vertically spaced switches in said second circuit, means for varying the distance between said switches, electro-magnets adjacent said switches, and a switch-operating member associated with said scales and adapted to be operated by said electro-magnets.

12. In a bottle-testing machine, weighing scales including a platform, an electric circuit including a relay switch controlling a kicker member for cooperation with said platform, a second circuit for controlling said relay switch, a pair of vertically spaced switches in said second circuit, electro-magnets adjacent said switches, a switch-operating member associated with said scales and adapted to be operated by said electro-magnets, and means for periodically rendering said second circuit inoperative.

13. In a bottle-testing machine, weighing scales, a kicker member, an electric circuit controlling the kicker member, a switch in said circuit, means for closing said switch, and means instantly rendering inoperative said switch-closing means.

14. In a bottle-testing machine, weighing scales, a kicker member, an electric circuit controlling the kicker member, a switch in said circuit, electrical means for closing said switch, and means rendering inoperative said electrical switch-closing means instantly upon its functioning to close said switch.

15. In a bottle-testing machine, weighing scales, a kicker member, an electric circuit controlling the kicker member, a switch in said circuit, an electro-magnet for closing said switch, and means rendering inoperative said electro-magnet instantly upon its functioning to close said switch.

16. In a bottle-testing machine, weighing scales including a platform and a beam, a kicker member, an electric circuit controlling the kicker member, a switch in said circuit, a switch operating member carried by said beam, an electro-magnet for moving said switch operating member to close said switch, and means instantly deenergizing said electro-magnet upon its functioning to close said switch.

THOMAS W. BRYANT.